United States Patent [19]

Howell, Jr. et al.

[11] Patent Number: 4,734,683

[45] Date of Patent: Mar. 29, 1988

[54] ELECTRONIC ROW WIDTH MONITOR

[76] Inventors: Mark E. Howell, Jr., Rte. 1, Box 1316, Parma, Id. 83660; James M. Howell, Rte. #2, Wilder, Id. 83676

[21] Appl. No.: 15,555

[22] Filed: Feb. 10, 1987

Related U.S. Application Data

[63] Continuation-in-part of Ser. No. 797,607, Nov. 13, 1985, abandoned.

[51] Int. Cl.$^4$ .............................................. G08B 21/00
[52] U.S. Cl. .................. 340/684; 340/52 R; 172/26; 280/776
[58] Field of Search ............ 340/684, 686, 988, 52 R; 180/131; 172/26, 175, 176; 104/244.1; 280/776

[56] References Cited

U.S. PATENT DOCUMENTS

| | | | |
|---|---|---|---|
| 3,611,286 | 10/1971 | Cleveland | 340/684 |
| 3,797,602 | 3/1974 | Sumida | 172/26 |
| 3,844,372 | 10/1974 | Neece | 172/26 |
| 4,414,903 | 11/1983 | Fasse et al. | 180/131 X |
| 4,484,647 | 11/1984 | McGrew | 172/26 X |

Primary Examiner—Charles A. Ruehl
Assistant Examiner—Brian R. Tumm
Attorney, Agent, or Firm—Leslie G. Murray

[57] ABSTRACT

A vehicle guidance system which monitors the path of a towed farm implement with respect to a track provided by a previously cut furrow and provides visual cues to the towing tractor operator to maintain the path of the towed implement parallel to the track of the previously cut furrow at a constant, predetermined distance regardless of the path of the tractor towing the implement. The guidance system includes an elongated metal sled runner which is mounted on a doubly articulated carriage device. The sled runner rides in a previously cut furrow and closes an appropriate microswitch if the towed implement veers from the desired path.

1 Claim, 5 Drawing Figures

ELECTRONIC ROW WIDTH MONITOR

CROSS REFERENCE TO RELATED APPLICATION

This application is a continuation-in-part of application Ser. No. 797,607, filed Nov. 13, 1985, now abandoned.

BACKGROUND OF THE INVENTION

The present invention relates generally to automatic guidance control systems for providing signals to control the direction of travel of a moving vehicle to follow a prescribed path. More particularly, the present invention relates to a guidance control system for providing visual cues to augment operator control for guiding agricultural vehicles while following a previously plowed furrow or guiding means in a field under cultivation.

The increase of the average farm size and the need to produce the maximum amount of agricultural products from a given amount of acreage at a minimum cost has resulted in the use of larger farm equipment and the need for greater efficiency. The guidance of this larger, and usually wider, equipment while in the field can have considerable effect upon the machine's effective field capacity and thus its field efficiency. Some agricultural operations require extreme guidance accuracy due to various reasons. Each plowed furrow should be parallel with all other furrows and spaced at very accurate separation distances. Another example concerns applications of herbicide. If two "passes" lap over one another possible damage to the crop may result, or, conversely, a strip completely missed results in no weed control.

Many methods of guidance have been utilized to either augment or replace the equipment operator. Systems for remotely guiding vehicles by operator control or in combination with automatic mechanical-hydraulic guidance mechanisms which follow a pre-established path are well known in the art. Remote control and other systems providing fully automatic guidance of an agricultural vehicle, such as a tractor, frequently utilize complex electric or electro-hydraulic servo control mechanisms along with other electronic circuitry. Other systems rely on electronic sensors for detecting guide markers previously emplanted in the ground. In the agricultural environment, these largely electronic systems require much cost and maintenance to assure their reliability over extended periods of use. Repair of these units typically require a person with an electronics background and associated electronic support equipment and tools. Furthermore, the front end cost of such guidance apparatus is substantial.

U.S. Pat. No. 3,797,602 entitled "Vehicle Guidance System" issued to Harry H. Sumida on Mar. 19, 1974, discloses a mechanical guidance apparatus which overcomes many of the problems associated with electronic systems dicusses above. However, there are many problems associated with Sumida.

Sumida discloses a trailing wheel apparatus followng a precut trench. A separate trench cutting mechanism is utilized to provide the precut trench. As the trailing wheel apparatus is towed, centered directly behind the tractor, the trench cutting mechanism must be extended a substantial distance beyond the side of the farm implement being used so that guide trenches for a succeeding path are formed so as to assure there will be no overlap in the area of the field being worked by the implement. This makes the implement bulky and less easy to maneuver. Further since the trench cutting mechanism is passive in nature and operatively engages the ground at all times while the implement is working the field, more pulling power is required of the tractor.

U.S. Pat. No. 4,484,647 entitled "Apparatus for Guiding a Vehicle Pulling an Implement Including Trench Forming and Following Means" issued to John McGraw on Nov. 27, 1984, discloses an apparatus which overcomes some of the problems of Sumida at the expense of being more complicated. McGraw provides an apparatus comprising a wheel which follows a precut trench and includes an integral trench cutting member which can be hydraulically lowered into cutting position or raised to a non-cutting position.

SUMMARY OF THE INVENTION

In accordance with the principles of the present invention, a vehicle guidance system for providing visual cues to augment operator control for guiding a vehicle, such as a farm tractor or the like, along a preset path is provided. The guidance system monitors the path of the implement with respect to the track provided by a previously cut furrow and provides visual cues to the tractor operator to maintain the path of the towed implement parallel to the track of the previously cut furrow at a constant, predetermined distance regardless of the path of the tractor towing the implement. The guidance system includes a doubly articulated carriage device which provides a mounting bracket at one end for an elongated metal sled. The opposite end of the carriage device mounts on the side or a back corner of the implement being towed or on the tractor itself. The metal sled rides in a furrow cut on the previous pass and will close an appropriate microswitch if the tractor or the towed implement veers from a path parallel to the furrow thereby providing a correction signal to the tractor operator. The guidance system includes a panel mounted in the view of the operator which has colored lights indicated direction to steer and a power switch mounted on it.

The present invention provides a vehicle guidance system which is highly accurate, rugged and basically mechanical and which eliminates much of the "eyeballing" associated with row crop operation, chemical application, etc. As a result there is much less strain on the operator and the tractor operator can devote more time to monitoring the actual operation being performed. Because the furrow following device is an elongated sled, it is much more sensitive than the wheels or discs of the prior art resulting in less overlap and less field being missed during succeeding passes. Since the guidance system monitors and maintains a constant relationship between the towed implement and the previously cut furrow, its use is particularly advantageous when working fields on hilly or sloped land as the tractor and towed implement may follow two different paths across the face of a slope. Further, the system contains no complex electronics to maintain and, relative to the prior art, few moving parts.

The present invention, being largely mechanical in nature offers substantial advantages over largely electronic systems with respect to maintenance, reliability and cost.

BRIEF DESCRIPTION OF THE DRAWINGS

The present invention, both as to design and method operation, together with further objectives and advantages may be best understood by reference to the accompanying drawings in which.

DESCRIPTION OF THE PREFERRED EMBODIMENT

Figure 1:
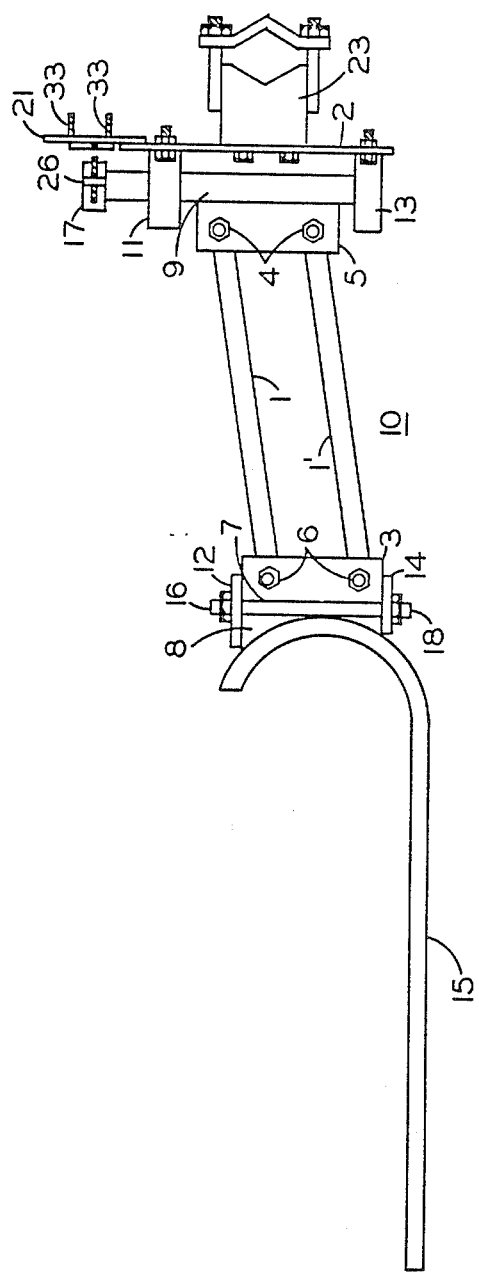
FIG. 1 is a side elevational view of a guidance system in accordance with the present invention.
Figure 2:
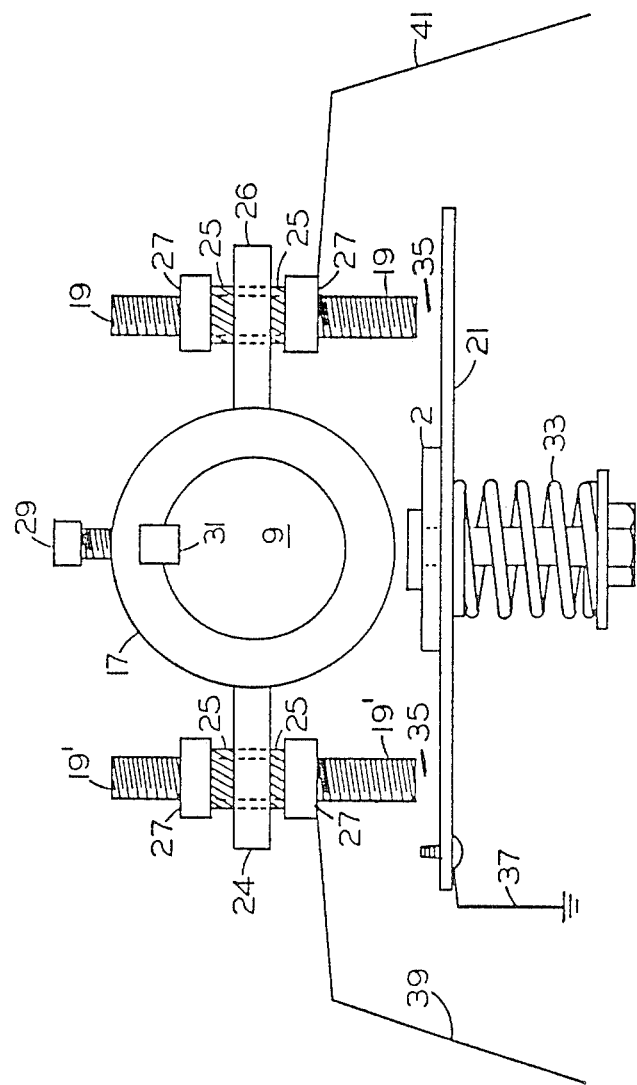
FIG. 2 is a plan view illustrating the electrical contact switches of the guidance system shown in FIG. 1.

Referring now to FIGS. 1 and 2, a vehicle guidance system according to the concepts of the present invention is shown. Those skilled in the art will understand that the positions and physical dimensions of the various elements may be adjusted according to the specific construction of the vehicle and implements utilized therewith. A trailing sled runner 15 riding in a previously cut furrow (not shown) is coupled to electrical contacts 19 and 19' by compound articulated carriage device 10 to provide visual cues to an operator representing the position of a conventional tractor (not shown) with respect to the furrow in a manner to be described below.

A vertical foward mounting plate 2 is rigidly attached to a tractor (not shown) or a farm implement (not shown), such as a disc, being pulled by the tractor, by mounting bracket 23. Mounting shaft 9 is rotationally mounted for rotation about the vertical axis on mounting plate 2 in bushing assemblies 11 and 13 at the upper and lower ends of the mounting plate 2, respectively. Support member 5 is rigidly attached in vertical orientation by welding, or some other suitable method, to mounting shaft 9. Support member 5 has two aperatures (not shown), one proximate the upper end and one proximate the lower end, respectively, of support member 5. The two aperatures are fixed with conventional bushings (not shown) for receiving nut and bolt assemblies 4. Upper and lower horizontal frame bars 1 and 1' are pivotally fixed to support member 5 for rotation about the axis of nut and bolt assemblies 4 and the bushings in the aperatures of support member 5. Similarly, the other ends, or rearward ends, of frame bars 1 and 1' are pivotally fixed to support member 3 by nut and bolt assemblies 6. Thus, carriage device 10 is free to rotate in the vertical plane about the axis of the nut and bolt assemblies 4 and 6 and also able to rotate in the horizontal plane about the vertical axis of support shaft 9. As a result, sled runner 15 is free to follow vertical undulations in the precut farrow.

Pivot pin 7 is fixedly attached in vertical orientation to the rearward edge of support member 3. The forward, curved end of elongated sled runner 15 has an integral mounting flange 8 with drilled tabs 12 and 14 at the top and bottom of flange 8, respectively. Drilled tabs 12 and 14 are fitted with bushings (not shown) for receiving the ends of pivot pin 7; pivot pin 7 is mounted in vertical position and secured with bolt and washer assemblies 16 and 18 to provide another horizontally articulated joint in the carriage device 10.

Referring now to FIG. 2, contact collar 17 is positioned on the upper end of mounting shaft 9 and held in position by set screw 29. Proper orientation of contact collar 17 is assured by key 31. Protruding outwardly, parallel to the major plane of the mounting plate 2, from opposite sides of contact collar 17 are mounting tabs 24 and 26 fitted with insulating bushings 25. Identical contact points 19 and 19' are mounted in each mounting tab 26 and 24 with adjustment nuts 27. Contact plate 21 is pivotally attached to the upper end of mounting plate 2 with bolt and spring assembly 33. The contact plate 21 is vertically oriented, parallel to the major plane of the mounting plate 2, and opposite the contact points 19 and 19' in spaced apart relation to form gaps 35. The spacing between contact points 19 and 19' and contact plate 21, gaps 35, may be adjusted with adjustment nuts 27. Contact plate 21 is grounded to the tractor frame (not shown) via conductor 37.

Figure 3:
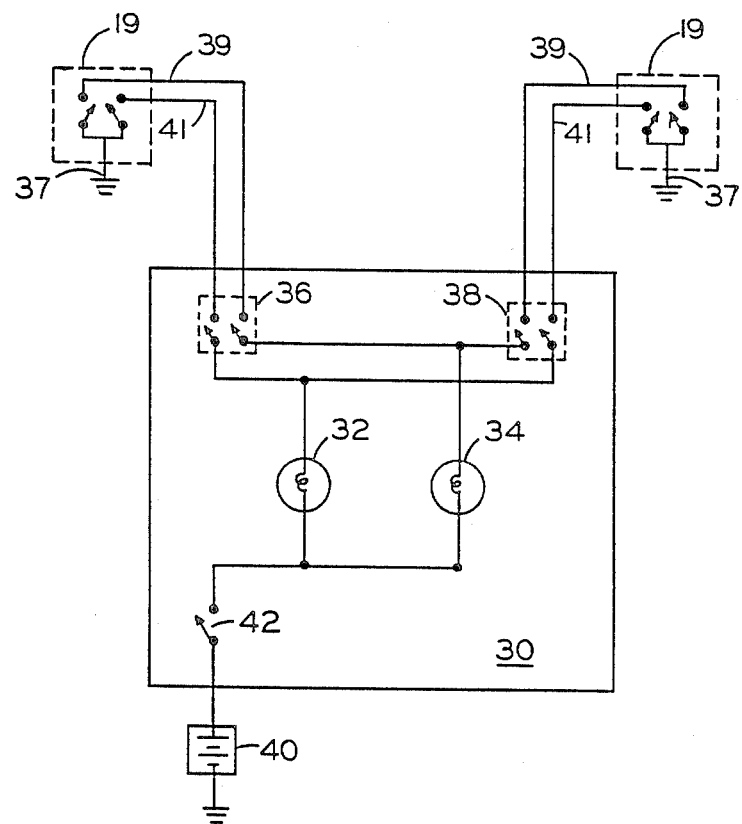
FIG. 3 is a schematic diagram of the control panel and electrical system of the guidance system in FIG. 1.

Referring now to FIG. 3, control panel 30 is mounted in the cockpit of the tractor (not shown) in easy view of the operator. Mounted on the control panel 30 are steer-left light 32, steer-right light 34 and the system power switch 42. The control panel 40 also has provisions for left select switches 36 and right select switches 38 to provide the option of mounting two position detecting systems, one on each side of the tractor or implement being pulled thereby allowing a field to be worked in both directions. The guidance system is powered by any convenient power source, such as the tractor 12 volt battery 40. Contact points 19 are electrically connected to the steer-left light 32 and the steer-right light 34 by conductors 41 and 39, respectively, and to ground via the contact plate 21 (as shown in FIG. 2) and conductor 37.

Figure 4:
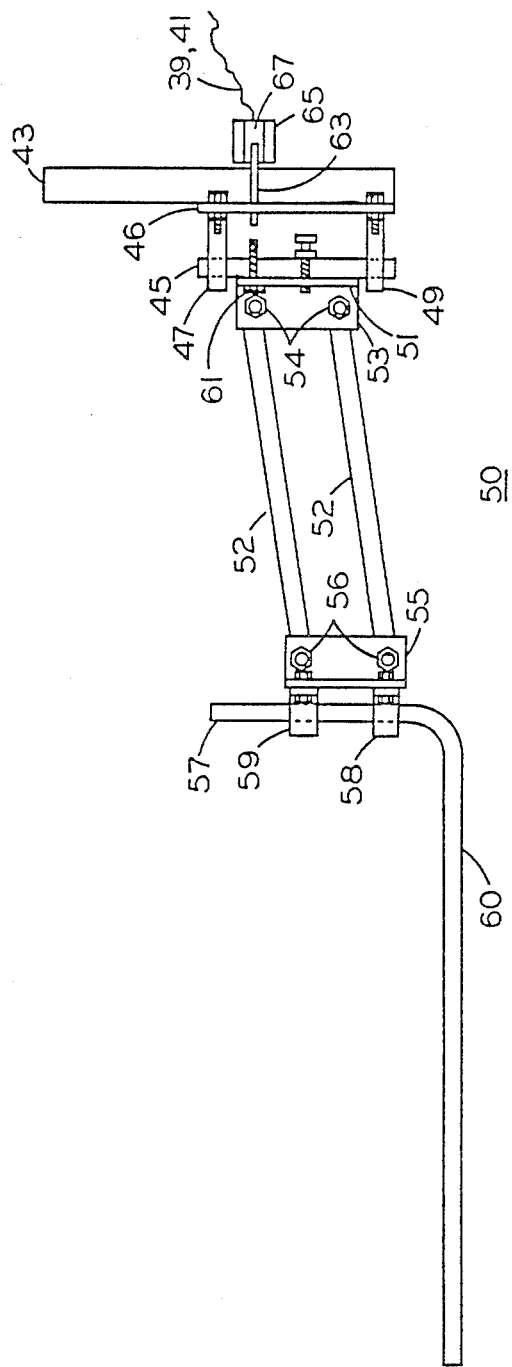
FIG. 4 is a side elevational view of an alternate embodiment of a guidance system in accordance with the present invention.

Referring now to FIG. 4, a second preferred embodiment of a vehicle guidance system according to the concepts of the present invention is shown. Vertically orientated bar 43 having mounting plate 46 and switch box 65 welded to it is rigidly attached to a tractor or towed farm implement (not shown) by mounting brackets (not shown). Mounting shaft 45 is rotationally mounted for rotation about its vertical axis on mounting plate 46 is bushing assemblies 47 and 49 at the upper and lower ends of the mounting plate 46, respectively. Support member 53 including normally extending mounting flange 51 is rigidly attached in vertical orientation by welding to mounting shaft 45. Support member 53 has two aperatures (not shown), one proximate the upper end and one proximate the lower end, respectively, of support member 53. The two aperatures are fixed with conventional bushings (not shown) for receiving nut and bolt assemblies 54. Upper and lower horizontal frame bars 52 and 52' are pivotally mounted in the bushings to support member 53 for rotation about the horizontal axis of nut and bolt assemblies 54. Similarly, the other ends, or rearward ends, of frame bars 52 and 52' are pivotally mounted to support member 55 by nut and bolt assemblies 56 through bushings (not shown). Sled runner 60 is rotationally mounted to support member 55 by bushing assemblies 58 and 59 at the bottom and top of support member 55, respectively. Sled runner 60 is free to rotate in horizontal plane about the vertical axis of its upcurved forward end 57 and support member 55 is free to rotate relative to frame bars 52, 52' in the vertical plane. Further, carriage device 50 is free to rotate in the vertical plane about the axis of the nut and bolt assemblies 54 and also able to rotate in the horizontal plane about the vertical axis of mounting shaft 45. Thus sled runner 15 is able to follow both vertical and horizontal undulations in a precut furrow without riding up on the edge or sides of the furrow while maintaining contact with the bottom of the furrow the entire length of the horizontal portion of sled runner 60.

Figure 5:
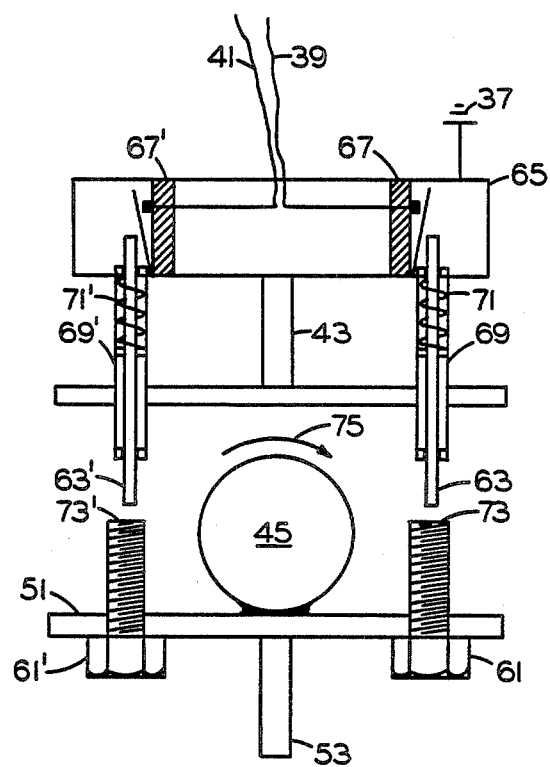
FIG. 5 is a plan view illustrating the electrical contact switches of the embodiment shown in FIG. 4.

Referring now also to FIG. 5, support member 53 includes normally extending mounting flange 51 and is welded to mounting shaft 45. Protruding through mounting flange 51 are bolts 61 and 61'. Plunger assemblies 69 and 69' mounted in switch box 65 protrude through holes drilled in mounting plate 46 opposite the ends of bolts 61 and 61'. Switch shafts 63, 63' slidably mounted within plunger assemblies 69, 69', are operatable to close switches 67, 67' when contacted and urged inward by bolts 61, 61', respectively. Switch shafts 63, 63' are spring-loaded to the switch 67, 67' open position by internally mounted springs 71, 71', respectively.

Referring now to FIGS. 1, 2 and 3, assume that a tractor pulling a disc (not shown) with the guidance system mounted on the disc is closely following the desired preset path. In that event, trailing sled runner 15 rides in the previously cut furrow in a path that closely parallels the path of the disc and hence the path of the tractor, and the sled runner 15 is coupled to the disc by the carriage device 10 with the horizontal frame bars 1 and 1' at some angle relative to the path of the sled runner 15. The angle of the frame bars 1 and 1' is determined by the desired spacing between the furrows. Adjustment of the gaps 35 (with adjusting nuts 27) allow the spacing to be set at any desired amount. As long as the tractor followsin close alignment with the previously cut furrow, maintaining a parallel path with the path of the sled runner 15, the angle of the frame bars 1 and 1' does not change. However, should the tractor tend to veer slightly to the right, the angle of frame bars 1 and 1' will change sufficiently with respect to the path of the tractor that the contact point 19' will contact the contact plate 21 thereby lighting the steer-left light 32 and providing the operator with a visual command to correct the tractor path. If the tractor should continue to the right after the contact point 19 has come into physical contact with the contact plate 21, spring 33 will give allowing the contact plate 21 to be pushed away from the mounting plate 2 without damage. In like manner, if the tractor tends to veer to the left of the desired path, the steer-right light 34 is energized. The gaps 35 can be adjusted to provide varying degrees of sensitivity and allow a limited amount of variation from the desired path. Use of an elongated runner provides the capability to detect minute deviations in the path of the tractor because of the parallel relationship between the path of the tractor and the path of the sled runner 15.

Referring now to FIGS. 3, 4 and 5, the second embodiment shown in FIGS. 4 and 5 operates in a similar manner to the operation described herein above. The angle of the frame bars 52, 52' with respect to the path of the towed implement is determined by the desired spacing between the furrows. As long as the tractor follows a path such that the path of the towed implement is parallel to the path of the sled runner 60 in the previously cut furrow, the angle of the frame bars 52, 52' with respect to the path of the towed implement will not change. However, should the tractor tend to veer slightly to the right, the angle of the frame bars 52, 52' will decrease with respect to the path of the towed implement causing support member 53 and hence mounting shaft 45 to rotate in the direction shown by arrow 75. Sufficient rotation of mounting shaft 45 will close gap 73' bringing protruding bolt 61' into contact with switch shaft 63' energizing the steer left light 32 thus providing the operator with a visual command to steer left and correct the path of the towed implement. Gaps 73, 73' may be adjusted by bolts 61, 61' to set the furrow spacing at any desired amount and to adjust the sensitivity.

In the above description it has assumed that the tractor and implement were being operated on level ground. It should be noted that in the case of hilly or sloped ground, the tractor and the implement being towed will travel different paths to maintain a constant width between the furrows being cut on each pass. The guidance system monitors the relationship between the path of sled runner 15 and the path of the vehicle or towed implement that the guidance is mounted on. In the case of an implement being towed on a side slope, the guidance system provides visual cues to the tractor operator to maintain the path of the towed implement parallel to the path of the sled runner 15 regardless of the path of the tractor thereby maintaining a constant distance between the furrows.

While the described invention has been particularly shown and described with reference to the preferred embodiment thereof, it will be understood by those skilled in the art that various changes in form and details may be made therein without departing from the spirit and scope of the present invention.

We claim:

1. A guidance system for providing guidance signals to an operator for guiding a vehicle to provide a desired path for a towed implement with respect to a precut furrow, said system comprising;

a mounting member removeably attached to said towed implement;

upper and lower elongated parallel frame members disposed intermediate forward and aft pivot members, said parallel frame members pivotally attached to said forward and aft pivot members permitting said parallel frame members to pivot in the vertical plane with respect to said forward and aft pivot members;

a forward mounting pin rotatably attached in a vertical orientation to said mounting member, said forward pivot member rigidly attached to said forward mounting pin permitting said parallel frame members to pivot in a horizontal plane about the vertical axis of said forward mounting pin;

elongated sled runner means having a forward upwardly curved end portion, said upwardly curved end portion orientated in the vertical plane and rotatably attached to said aft pivot member permitting said sled runner means to pivot in the horizontal plane about the vertical axis of said upwardly curved end portion and permitting motion of said sled runner means in the vertical plane while maintaining said sled runner means in a horizontal orientation, said sled runner means normally riding in said precut furrow;

first and second normally open switch means fixedly attached to said forward mounting pin in spaced apart relationship with said mounting member, said parallel frame members responsive to the motion of said towed implement to rotate said forward mounting pin closing said first switch means if said towed implement veers beyond a predetermined angle in a first direction with respect to said precut furrow and closing said second switch means if said towed implement veers beyond a predetermined angle in a second direction with respect to said precut furrow; and first and second signaling means coupled to said first and second switch means, respectively, said first signaling means activated when said first switch is closed and said second signaling means activated when said second switch is closed.

* * * * *